United States Patent
Westerman et al.

(10) Patent No.: US 9,870,137 B2
(45) Date of Patent: Jan. 16, 2018

(54) SPEED/POSITIONAL MODE TRANSLATIONS

(71) Applicant: Apple Inc., Cupertino, CA (US)

(72) Inventors: Wayne Carl Westerman, Burlingame, CA (US); Sean E. O'Connor, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/681,230

(22) Filed: Aug. 18, 2017

(65) Prior Publication Data

US 2017/0344213 A1 Nov. 30, 2017

Related U.S. Application Data

(62) Division of application No. 11/818,397, filed on Jun. 13, 2007, now Pat. No. 9,740,386.

(51) Int. Cl.
*G06F 3/0485* (2013.01)
*G06F 3/0488* (2013.01)

(52) U.S. Cl.
CPC ........ *G06F 3/0485* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 5,327,161 A | 7/1994 | Logan et al. | |
| 5,483,261 A | 1/1996 | Yasutake | |
| 5,488,204 A | 1/1996 | Mead et al. | |
| 5,543,591 A | 8/1996 | Gillespie et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |

(Continued)

FOREIGN PATENT DOCUMENTS

| EP | 1 058 924 | 12/2000 |
|---|---|---|
| EP | 1 745 356 | 1/2007 |

(Continued)

OTHER PUBLICATIONS

"Cursor for Arbitrary Directional Pan", IBM Technical Disclosure Bulletin, IBM Corp., New York, vol. 33, No. 6A, Nov. 1, 1990.
Final Office Action dated Sep. 20, 2011, for U.S. Appl. No. 11/818,397, filed Jun. 13, 2007, 12 pages.
Final Office Action dated Oct. 28, 2016, for U.S. Appl. No. 11/818,397, filed Jun. 13, 2007, 12 pages.

(Continued)

*Primary Examiner* — Seokyun Moon
(74) *Attorney, Agent, or Firm* — Morrison & Foerster LLP

(57) ABSTRACT

Gestures for converting from a position control mode to a motion continuation mode are disclosed. A position control mode can be invoked when the user simultaneously places two or more fingers upon a sensor panel. The fingers can then be moved around to effect position control. A motion continuation mode can be invoked when one or more fingers are lifted off (but at least one finger remains in contact with the sensor panel). If the motion continuation mode is invoked, a virtual control ring can be generated, and scrolling of the viewable area or dragging of the cursor or object can continue in a particular direction specified by a velocity vector pointed in the direction of finger movement at the time the motion continuation mode is invoked, and having a magnitude proportional to the velocity of the finger at the time the motion continuation mode was invoked.

25 Claims, 11 Drawing Sheets

(56) References Cited

U.S. PATENT DOCUMENTS

| | | |
|---|---|---|
| 6,278,443 B1 | 8/2001 | Amro et al. |
| 6,310,610 B1 | 10/2001 | Beaton et al. |
| 6,323,846 B1 | 11/2001 | Westerman et al. |
| 6,496,182 B1 | 12/2002 | Wong et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2006/0164399 A1 | 7/2006 | Cheston et al. |
| 2006/0197753 A1 | 9/2006 | Hotelling |
| 2006/0232567 A1 | 10/2006 | Westerman et al. |
| 2006/0238522 A1 | 10/2006 | Westerman et al. |
| 2007/0236475 A1 | 10/2007 | Wherry |
| 2007/0257891 A1 | 11/2007 | Esenther et al. |
| 2008/0106523 A1 | 5/2008 | Conrad |
| 2008/0158172 A1 | 7/2008 | Hotelling et al. |
| 2008/0165158 A1 | 7/2008 | Hotelling et al. |
| 2009/0051659 A1 | 2/2009 | Mickelborough |

FOREIGN PATENT DOCUMENTS

| | | |
|---|---|---|
| JP | 2000-163031 A | 6/2000 |
| JP | 2002-342033 A | 11/2002 |
| WO | WO-2007/089766 A2 | 8/2007 |
| WO | WO-2008/157241 A1 | 12/2008 |

OTHER PUBLICATIONS

International Search Report dated Sep. 3, 2008, for PCT Application No. PCT/US2008/066731, file Jun. 12, 2008, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Jan. 5, 2016, for U.S. Appl. No. 11/818,397, filed Jun. 13, 2007, 13 pages.

Non-Final Office Action dated Mar. 21, 2011, for U.S. Appl. No. 11/818,397, filed Jun. 13, 2007, 11 pages.

Notice of Allowance dated Apr. 19, 2017, for U.S. Appl. No. 11/818,397, filed Jun. 13, 2007, eight pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Search Report completed Apr. 23, 2009, for Dutch Patent Application No. 2001669, English translation, three pages.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Westerman, Wayne, Hand Tracking Finger Identification, and Chordic Manipulation on a Multi-Touch Surface, Dissertation ~ University of Delaware, 1999 (Spring), 103 pages.

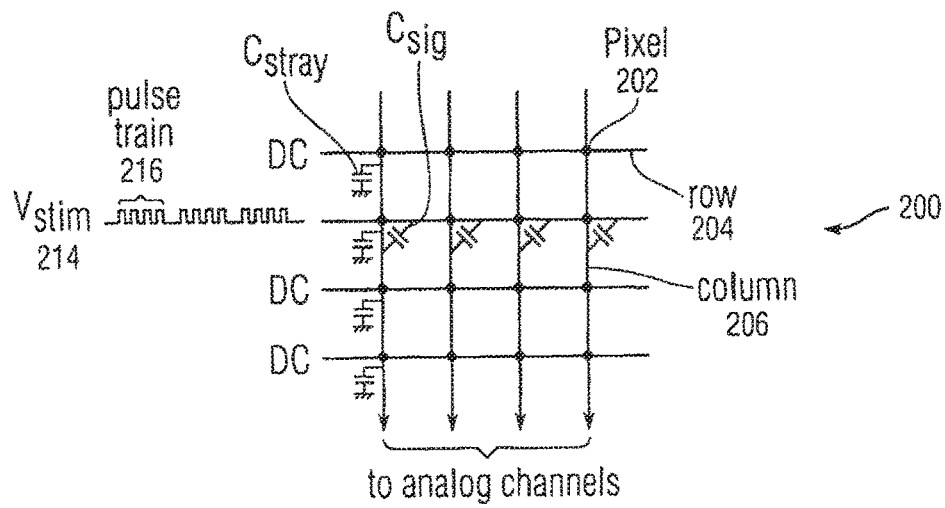
Fig. 2a
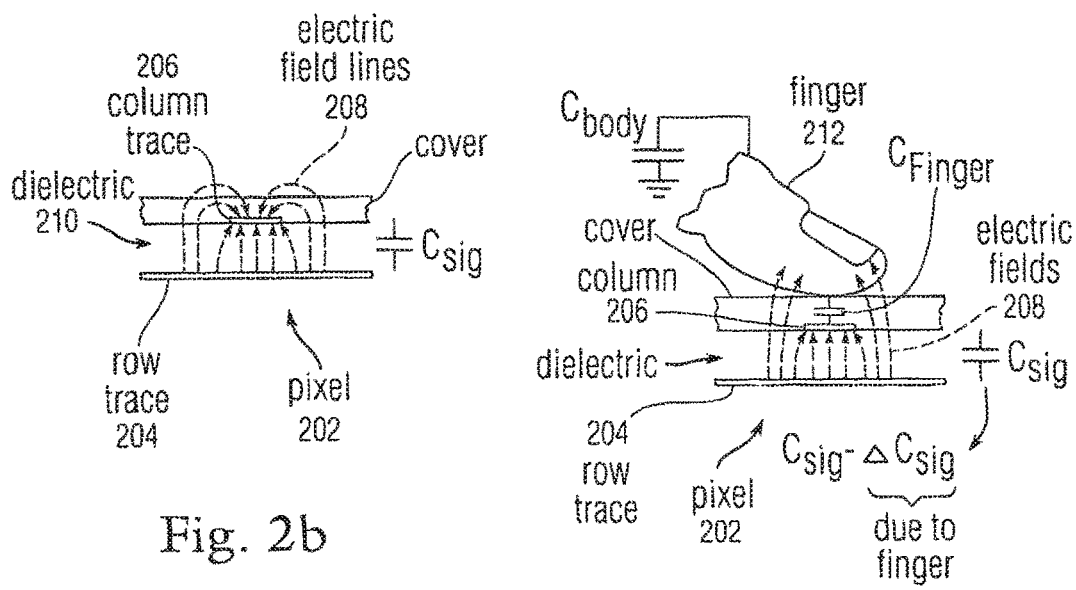
Fig. 2b
Fig. 2c

SPEED/POSITIONAL MODE TRANSLATIONS

CROSS-REFERENCE TO RELATED APPLICATIONS

This application is a divisional of U.S. patent application Ser. No. 11/818,397 (now U.S. Publication No. 2008-0309626), filed on Jun. 13, 2007, the entire disclosure of which is incorporated herein by reference for all purposes.

FIELD OF THE INVENTION

This relates to gestures detectable at the surface of a touch sensor panel, and more particularly, to the detection of finger gestures to invoke position control and motion continuation modes.

BACKGROUND OF THE INVENTION

There exist today many styles of input devices for performing operations in a computer system. The operations generally correspond to moving a cursor and making selections on a display screen. The operations can also include paging, scrolling, panning, zooming, etc. By way of example, the input devices can include buttons, switches, keyboards, mice, trackballs, touch pads, joy sticks, touch screens and the like. Each of these devices has advantages and disadvantages that can be taken into account when designing a computer system.

With touch pad instruments such as touch pads on a personal laptop computer, the movement of the input pointer on a display generally corresponds to the relative movements of the user's finger (or stylus) as the finger is moved along a surface of the touch pad. Touch screens, on the other hand, are a type of display screen that can include a touch-sensitive transparent panel (or "skin") that can overlay the display screen. When using a touch screen, a user typically makes a selection on the display screen by pointing directly to objects (such as graphical user interface (GUI) objects) displayed on the screen (usually with a stylus or finger).

To provide additional functionality, finger and hand gestures have been implemented with some of these input devices. By way of example, a position control mode can be performed by touching one or more fingers down on the sensor panel and moving them around, and motion continuation modes such as scrolling or dragging can be initiated by using finger motion at the edge of the touch pad. These modes are described in U.S. Pat. No. 6,323,846 entitled "Method and Apparatus for Integrating Manual Input," the contents of which are incorporated by reference herein for all purposes. However, heretofore it has been relatively difficult to switch between position control and motion continuation modes.

SUMMARY OF THE INVENTION

This relates to gestures detectable by a sensor panel for converting from a position control mode to a motion continuation mode. A position control mode can be invoked when the user substantially simultaneously places two or more fingers upon sensor panel, either near or over a cursor or object. Alternatively, the fingers can be placed down anywhere on a sensor panel, and a cursor can appear near or under the fingers. As long as the two or more fingers remain touching the sensor panel, the fingers can be moved around to effect position control on the object or cursor.

A motion continuation mode, which can include the scrolling of a viewable area or the dragging of a cursor or object, can be invoked when one or more fingers are lifted off, but at least one finger remains in contact with the sensor panel. This liftoff of fingers can be performed anywhere on the sensor panel, or can be limited to the edge of the sensor panel (where one or more fingers can be expected to move off the sensor panel to effectively create a liftoff condition). The latter can be detected in part by recognizing edge zones. Alternatively, if two or more fingers are detected in an edge zone, the motion continuation mode can be invoked even though no fingers are lifted. In other embodiments, the motion continuation mode can be invoked when one or more additional fingers are touched down on the sensor panel while the already-touching fingers remain in contact with the sensor panel, or the already-touching fingers are pushed down with more force or otherwise flattened against the sensor panel.

If the motion continuation mode is invoked as described above, scrolling of the viewable area or dragging of the cursor or object can continue in a particular direction. The remaining touching fingers do not have to continue moving. The speed and direction of the scrolling or dragging can be initially established by the speed and direction of the touching fingers at the time the motion continuation mode was invoked. Memory can be required to auto-regressively store finger velocity and direction so that when the motion continuation mode is invoked, the last stored velocity and direction can be retrieved, and the cursor or object can continue to move with the stored velocity in the stored direction.

When the motion continuation mode is invoked, a virtual control ring or joystick can be generated to provide enhanced motion continuation capabilities. The virtual control ring can be used as a joystick to navigate within a document, photo, web page, e-mail list, address book, calendar, game, and the like, especially on small touchscreens. The virtual control ring can be formed with a velocity vector pointed in the direction of finger movement at the time the motion continuation mode is invoked, and having a magnitude proportional to the velocity of the finger at the time the motion continuation mode was invoked. Back calculations based on the velocity of the finger at the time motion continuation was invoked can be performed to determine a zero velocity "null" or center position of the virtual control ring. The tip of velocity vector can be coincident with the calculated centroid of the patch generated by the finger. The virtual control ring can follow finger movement after the motion continuation mode is invoked.

If, during the motion continuation mode, one or more fingers are lifted off the sensor panel, scrolling or dragging can cease. If one or more fingers are put back down, normal cursor position control or object position control (dragging) can once again be invoked. Thus, the user can easily choose between cursor position control for fine positioning within the viewable area and motion continuation of a cursor or object for navigation over large distances.

BRIEF DESCRIPTION OF THE DRAWINGS

FIG. 2*a* illustrates an exemplary mutual capacitance touch sensor panel according to one embodiment of this invention.

FIG. 2*b* is a side view of an exemplary pixel in a steady-state (no-touch) condition according to one embodiment of this invention.

FIG. 2*c* is a side view of an exemplary pixel in a dynamic (touch) condition according to one embodiment of this invention.

DETAILED DESCRIPTION OF THE PREFERRED EMBODIMENT

Figure 1A:
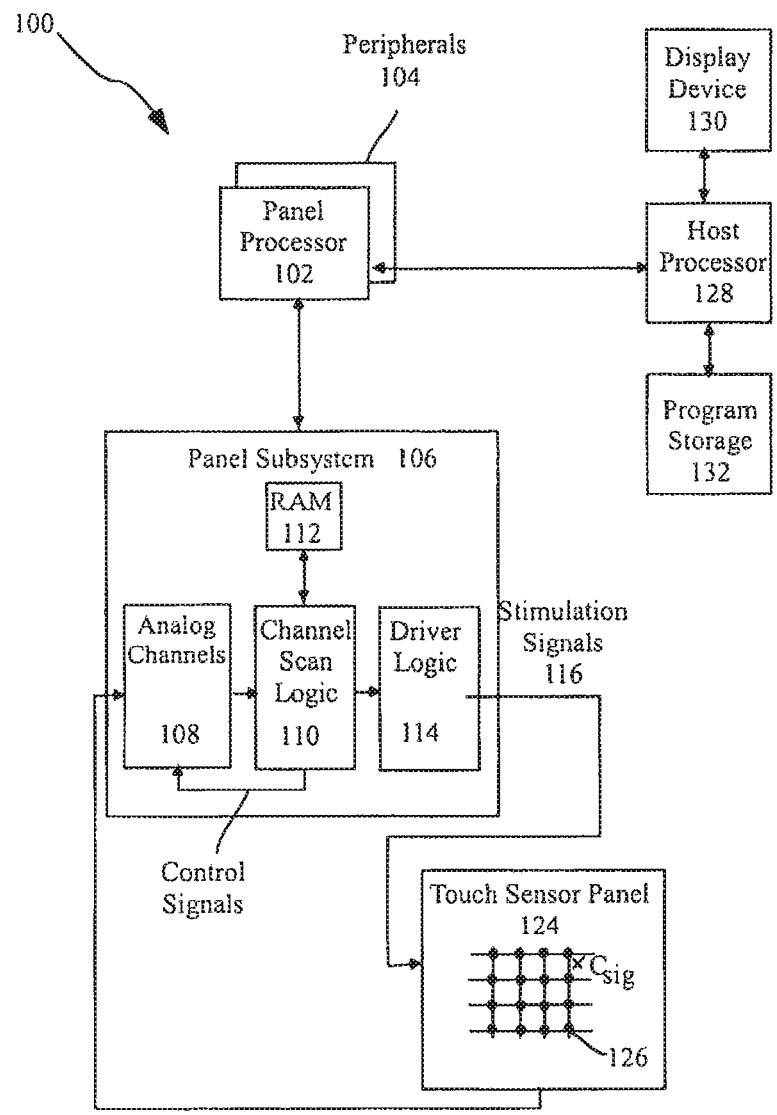
FIG. 1a illustrates an exemplary computing system that can detect finger and hand motions and switch between position control and motion continuation modes according to one embodiment of this invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to gestures detectable by a sensor panel for converting from a position control mode to a motion continuation mode. A position control mode can be invoked when the user substantially simultaneously places two or more fingers upon sensor panel, either near or over a cursor or object. As long as the two or more fingers remain touching the sensor panel, the fingers can be moved around to effect position control on the object or cursor. A motion continuation mode, which can include scrolling of a viewable area or dragging of a cursor or object, can be invoked when one or more fingers are lifted off (but at least one finger remains in contact with the sensor panel). This liftoff of fingers can be performed anywhere on the sensor panel, or can be limited to the edge of the sensor panel (where one or more fingers can be expected to move off the sensor panel to effectively create a liftoff condition).

If the motion continuation mode is invoked, scrolling of the viewable area or dragging of the cursor or object can continue in accordance with the speed and direction of the touching fingers at the time the motion continuation mode was invoked. The remaining touching fingers do not have to continue moving. When the motion continuation mode is invoked, a virtual control ring or joystick can be generated to provide enhanced motion continuation capabilities. The virtual control ring can be formed with a velocity vector pointed in the direction of finger movement at the time the motion continuation mode is invoked, and having a magnitude proportional to the velocity of the finger at the time the motion continuation mode was invoked. The virtual control ring can be used as a joystick to navigate within a document, photo, web page, e-mail list, address book, calendar, game, and the like, especially on small touchscreens.

If, during the motion continuation mode, one or more fingers are lifted off the sensor panel, scrolling or dragging can cease. If one or more fingers are put back down, normal cursor position control or object position control (scrolling and dragging) can once again be invoked. Thus, the user can easily choose between cursor position control for fine positioning on the viewable area and motion continuation of a cursor or an object for navigation over large distances.

Although some embodiments of this invention may be described generally herein in terms of touchscreens (touch sensor panels combined with display devices), it should be understood that embodiments of the invention can be applicable to touch tablets and other keyboards without a display device. In addition, although embodiments of the invention may be described herein in terms of certain fingers, it should be understood that any combinations of fingers can be used.

FIG. 1*a* illustrates exemplary computing system 100 that can detect finger and hand motions and switch between position control and motion continuation modes according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. One or more panel processors 102 or host processor 128 can execute software or firmware implementing the algorithm for detecting finger and hand motions and switching between position control and motion continuation modes according to embodiments of the invention. Peripherals 104 can include, but are not limited to, random access memory (RAM) or other types of memory or storage, watchdog timers and the like. Panel subsystem 106 can include, but is not limited to, one or more analog channels 108, channel scan logic 110 and driver logic 114. Channel scan logic 110 can access RAM 112, autonomously read data from the analog channels and provide control for the analog channels. In addition, channel scan logic 110 can control driver logic 114 to generate stimulation signals 116 at one or more frequencies and phases that can be selectively applied to rows of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substantially transparent substrate separated by a substantially transparent dielectric material, on opposite sides of the substrate, or on two separate substrates separated by the dielectric material.

At the "intersections" of the traces, where the traces pass above and below (cross) each other (but do not make direct electrical contact with each other), the traces can essentially form two electrodes (although more than two traces could intersect as well) representing a capacitive sensor. Each capacitive sensor can be viewed as picture element (pixel) 126, which can be particularly useful when touch sensor panel 124 is viewed as capturing an "image" of touch over a frame (one complete scan of the panel). (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig. Each column of touch sensor panel 124 can drive one or more analog channels 108 (also referred to herein as an event detection and demodulation circuit) in panel subsystem 106. Each analog channel 108 can generate a value representative of an amount of touch being sensed at the connected column, which can be indicative of a touch event at one or more pixels along that column. Touch sensor panel 124 can include single-touch or multi-touch sensor panels, the latter of which is described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Computing system 100 can correspond to a personal computer system, such as a desktop, laptop, tablet or hand-held computer. Computing system 100 can also correspond to a computing device, such as a mobile telephone, personal digital assistant (PDA), dedicated media player, consumer electronic device, and the like. Computing system 100 can include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device.

Figure 1B:
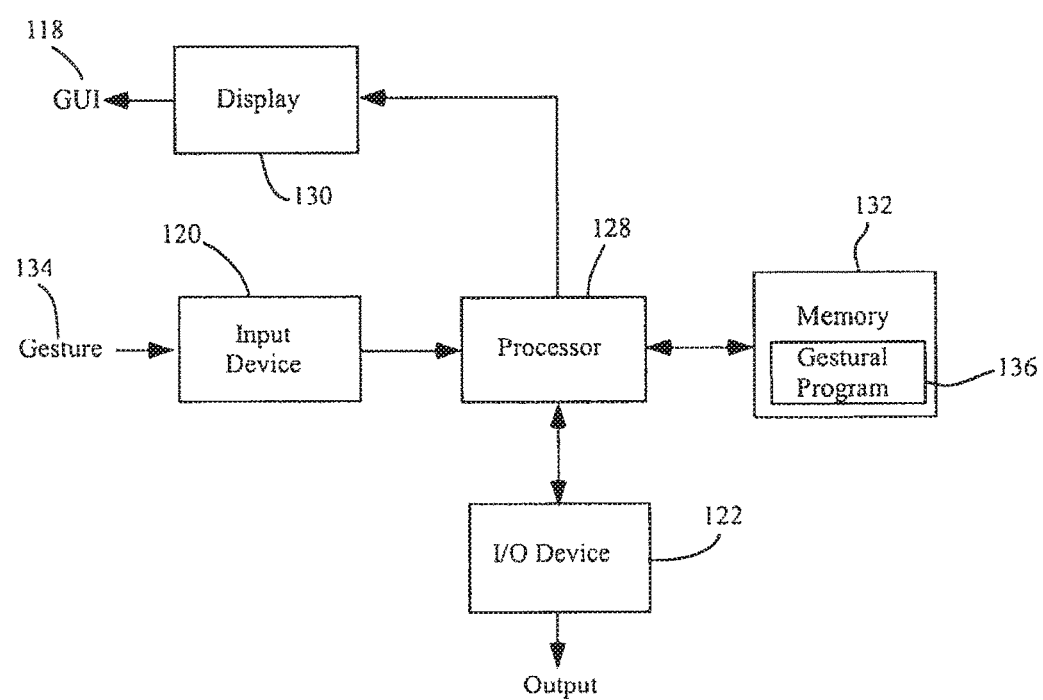
FIG. 1b is a block diagram of the exemplary host processor of FIG. 1a and connected devices according to one embodiment of this invention.

FIG. 1*b* is a block diagram of the exemplary host processor 128 of FIG. 1*a* and connected devices according to embodiments of the invention. Host processor 128 can be configured to execute instructions and to carry out operations associated with computing system 100. For example, using instructions retrieved from program storage 132, host processor 100 can control the reception and manipulation of input and output data between components of computing system 100. Host processor 128 can be implemented on a single-chip, multiple chips or multiple electrical components. For example, various architectures can be used for host processor 128, including a dedicated or embedded processor, a single purpose processor, controller, application specific integrated circuit (ASIC), and so forth.

In most cases, processor 128 together with an operating system (OS) can operate to execute computer code and produce and use data. OSs are generally well known and will not be described in greater detail. By way of example, the OS can correspond to OS/2, DOS, Unix, Linux, Palm OS, and the like. The OS can also be a special purpose OS, such as can be used for limited purpose appliance-type computing devices. The OS, other computer code and data can reside within memory block 132 that is operatively coupled to processor 128. Memory block 132 can generally provide a place to store computer code and data that are used by computing system 100. By way of example, memory block 132 can include Read-Only Memory (ROM), RAM, one or more hard disk drives and/or the like. The information can also reside on a removable storage medium and loaded or installed onto computing system 100 when needed. Removable storage mediums can include, for example, CD-ROMs, PC-CARDs, memory cards, floppy disks, magnetic tape, and a network component.

Computing system 100 can also include display device 130 that can be operatively coupled to processor 128. Display device 130 can be a liquid crystal display (LCD) (e.g., active matrix, passive matrix and the like). Alternatively, display device 130 can be a monitor such as a monochrome display, color graphics adapter (CGA) display, enhanced graphics adapter (EGA) display, variable-graphics-array (VGA) display, super VGA display, cathode ray tube (CRT), and the like. Display device 130 can also correspond to a plasma display or a display implemented with electronic inks.

Display device 130 can be configured to display GUI 118 that can provide an easy to use interface between a user of the computer system and the operating system or application running thereon. Generally speaking, GUI 118 can represent programs, files and operational options with graphical images, objects, or vector representations. The graphical images can include windows, fields, dialog boxes, menus, icons, buttons, cursors, scroll bars, etc. Such images can be arranged in predefined layouts, or can be created dynamically to serve the specific actions being taken by a user. During operation, the user can select and/or activate various graphical images in order to initiate functions and tasks associated therewith. By way of example, a user can select a button that opens, closes, minimizes, or maximizes a window, or an icon that launches a particular program. GUI 118 can additionally or alternatively display information, such as non interactive text and graphics, for the user on display device 130.

Computing system 100 can also include input device 120 that can be operatively coupled to processor 128. Input device 120 can be configured to transfer data from the outside world into computing system 100. Input device 120 can, for example, be used to perform tracking and to make selections with respect to GUI 118 on display 130. Input device 120 can also be used to issue commands in computing system 100. Input device 120 can include a touch sensing device such as touch sensor panel 124, configured to receive input from a user's touch and send this information to processor 128 through panel subsystem 106. In many cases, the touch-sensing device can recognize touches as well as the position and magnitude of touches on a touch sensitive surface. The touch sensing device can detect and report the touches to processor 128, and processor 128 can interpret the touches in accordance with its programming. For example, processor 128 can initiate a task in accordance with a particular touch. A dedicated processor can be used to process touches locally and reduce demand for the main processor of the computing system.

The touch sensing device can be based on sensing technologies including but not limited to capacitive sensing, resistive sensing, surface acoustic wave sensing, pressure sensing, optical sensing, and/or the like. Furthermore, the touch sensing means can be based on single point sensing or multipoint sensing. Single point sensing is capable of only distinguishing a single touch, while multipoint sensing is capable of distinguishing multiple touches that occur at the same time.

As discussed above, input device 120 can be a touch screen that can be positioned over or in front of display 130, integrated with display device 130, or can be a separate component, such as a touch pad.

Computing system 100 can also include capabilities for coupling to one or more I/O devices 122. By way of example, I/O devices 122 can correspond to keyboards, printers, scanners, cameras, microphones, speakers, and/or the like. I/O devices 122 can be integrated with computing system 100 or they can be separate components (e.g., peripheral devices). In some cases, I/O devices 122 can be connected to computing system 100 through wired connections (e.g., cables/ports). In other cases, I/O devices 122 can be connected to computing system 100 through wireless connections. By way of example, the data link can correspond to PS/2, USB, IR, Firewire, RF, Bluetooth or the like.

According to embodiments of the invention, computing system 100 can be designed to recognize gestures 134 applied to input device 120 and to control aspects of computing system 100 based on the gestures. In some cases, a gesture can be defined as a stylized interaction with an input device that can be mapped to one or more specific computing operations. Gestures 134 can be made through various hand, and more particularly finger motions. Alternatively or additionally, the gestures can be made with a stylus. In all of these cases, input device 120 can receive gestures 134, and processor 128 can execute instructions to carry out operations associated with the gestures 134. In addition, memory block 132 can include gesture operational program 136, which can be part of the OS or a separate application. Gesture operation program 136 can generally include a set of instructions that can recognize the occurrence of gestures 134 and can inform one or more software agents of the gestures and/or what action(s) to take in response to the gestures. Additional details regarding the various gestures that can be used as input commands are discussed further below.

Upon a user performing one or more gestures, input device 120 can relay gesture information to processor 128. Using instructions from memory 132, and more particularly, gesture operational program 136, processor 128 can interpret the gestures 134 and control different components of computing system 100, such as memory 132, display 130 and I/O devices 122, based on the gestures. Gestures 134 can be identified as commands for performing actions in applications stored in memory 132, modifying image objects shown on display 130, modifying data stored in memory 132, and/or for performing actions in I/O devices 122.

Note that although FIG. 1*b* illustrates input device 120 and display 130 as two separate boxes for illustration purposes, the two boxes can be realized on one device. It should also be noted that, while FIG. 1*a* illustrates dedicated panel processor 102, panel subsystem 106 can be controlled directly by the host processor 128. Additionally, it should also be noted that touch sensor panel 124 and display device 130 can be integrated into a single touch screen display device.

FIG. 2*a* illustrates exemplary mutual capacitance touch sensor panel 200 according to embodiments of the invention. FIG. 2*a* indicates the presence of a stray capacitance Cstray at each pixel 202 located at the intersection of a row 204 and a column 206 trace (although Cstray for only one column is illustrated in FIG. 2 for purposes of simplifying the figure). In the example of FIG. 2*a*, AC stimuli Vstim 214, Vstim 215 and Vstim 217 can be applied to several rows, while other rows can be connected to DC. Vstim 214, Vstim 215 and Vstim 217 can be at different frequencies and phases, as will be explained later. Each stimulation signal on a row can cause a charge $Qsig=Csig \times Vstim$ to be injected into the columns through the mutual capacitance present at the affected pixels. A change in the injected charge (Qsig_sense) can be detected when a finger, palm or other object is present at one or more of the affected pixels. Vstim signals 214, 215 and 217 can include one or more pulse trains 216, and each pulse train can include a particular number of a number of pulses. Although pulse trains 216 are shown as square waves, other waveshapes such as sine waves can also be employed. Note that although FIG. 2*a* illustrates rows 204 and columns 206 as being substantially perpendicular, they need not be so aligned, as described above. As described above, each column 206 can be connected to an analog channel (see analog channels 108 in FIG. 1).

FIG. 2*b* is a side view of exemplary pixel 202 in a steady-state (no-touch) condition according to embodiments of the invention. In FIG. 2*b*, an electric field of electric field lines 208 of the mutual capacitance between column 206 and row 204 traces or electrodes separated by dielectric 210 is shown.

FIG. 2*c* is a side view of exemplary pixel 202 in a dynamic (touch) condition. In FIG. 2*c*, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Further details of multi-touch sensor detection, including proximity detection by a touch panel, are described in commonly assigned and co-pending (1) U.S. application Ser. No. 10/840,862 entitled "Multipoint Touchscreen," which was published on May 11, 2006 as U.S. Publication No. US2006/0097991, (2) U.S. application Ser. No. 11/428,522 entitled "Identifying Contacts On A Touch Surface," which was published on Oct. 26, 2006 as U.S. Publication No. US2006/0238522, and (3) U.S. application Ser. No. 11/649,998 entitled "Proximity and Multi-Touch Sensor Detection and Demodulation," filed on Jan. 3, 2007, the entirety of each of which is hereby incorporated herein by reference.

Figure 3:
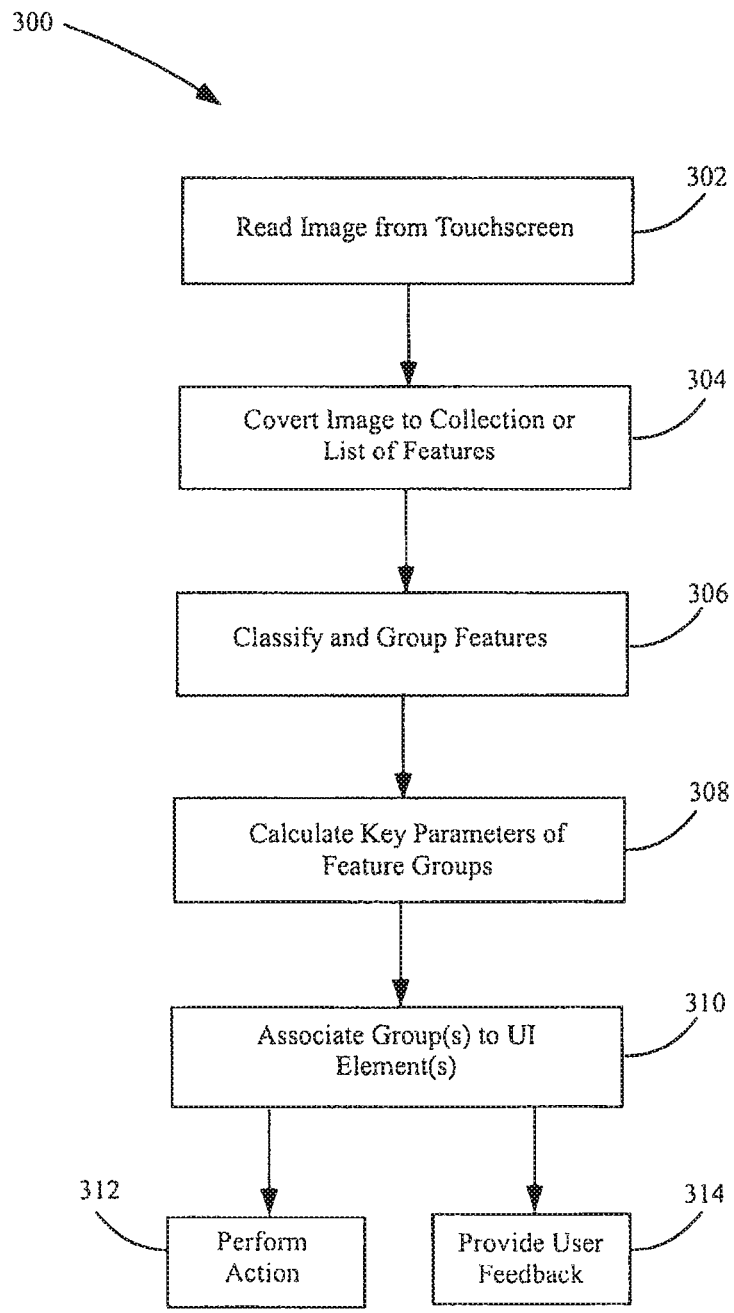
FIG. 3 is an exemplary multipoint processing method according to one embodiment of this invention.

FIG. 3 illustrates multipoint processing method 300 in accordance with embodiments of the invention. Multipoint processing method 300 can, for example, be performed with the system shown in FIG. 1a or FIG. 1b. Multipoint processing method 300 generally begins at block 302 where images can be read from a multipoint input device, and more particularly a multipoint touch screen. Although the term "image" may be used, it should be noted that the data can come in other forms. In most cases, the image read from the touch sensor panel can provide magnitude (Z) as a function of position (X and Y) for each sensing point or pixel of the touch sensor panel. The magnitude can, for example, reflect the capacitance measured at each point.

Following block 302, multipoint processing method 300 proceeds to block 304, where the image can be converted into a collection or list of features. Each feature can represent a distinct input such as a touch. In most cases, each feature can include its own unique identifier (ID), x coordinate, y coordinate, Z magnitude, angle Θ, area A, and the like.

Figure 4A:
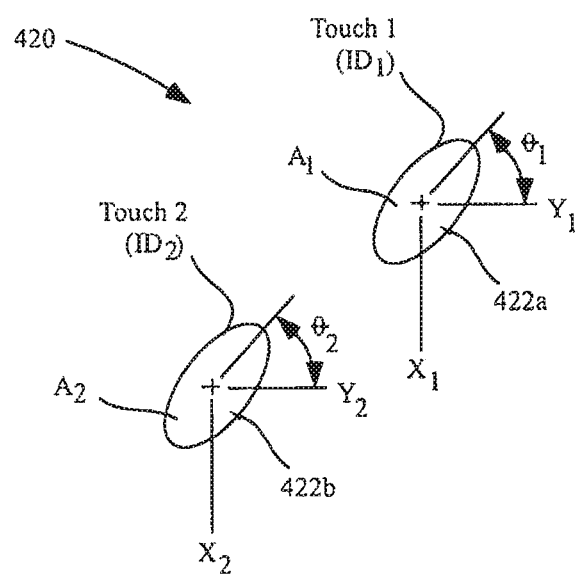
FIGS. 4*a* and 4*b* illustrate an exemplary image in time according to one embodiment of this invention.
Figure 4B:
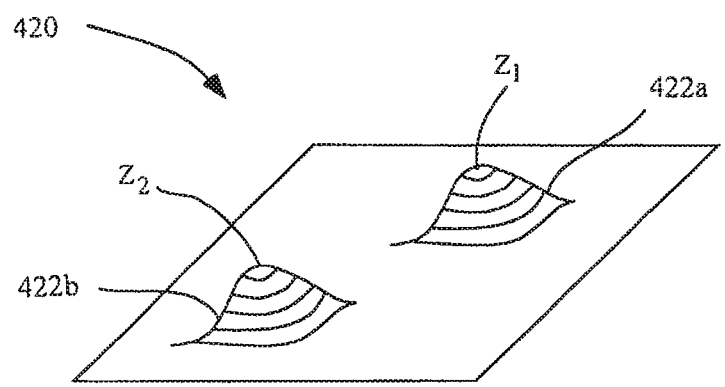

FIGS. 4a and 4b illustrate an exemplary image 420 in time according to embodiments of the invention. In image 420, there are two features 422 based on two distinct touches. The touches can for example be formed from a pair of fingers touching the touch screen. As shown, each feature 422 can include unique identifier (ID), x coordinate, y coordinate, Z magnitude, angle Θ, and area A. More particularly, the first feature 422A can be represented by $ID_1$, $X_1$, $Y_1$, $Z_1$, $\Theta_1$, $A_1$ and the second feature 422B can be represented by $ID_2$, $X_2$, $Y_2$, $Z_2$, $\Theta_2$, $A_2$. This data can be outputted for example using a multi-touch protocol.

The conversion from data or images to features can be accomplished using methods described in copending U.S. application Ser. No. 10/840,862 titled "Multipoint Touchscreen." As disclosed therein, the raw data can be received in a digitized form, and can include values for each node of the touch screen. The values can be between 0 and 256 where 0 equates to no touch pressure and 256 equates to full touch pressure. Thereafter, the raw data can be filtered to reduce noise. Once filtered, gradient data, which indicates the topology of each group of connected points, can be generated. Thereafter, the boundaries for touch regions can be calculated based on the gradient data (i.e., a determination can be made as to which points are grouped together to form each touch region). By way of example, a watershed algorithm can be used. Once the boundaries are determined, the data for each of the touch regions can be calculated (e.g., X, Y, Z, Θ, A).

Referring again to FIG. 3, following block 304, multipoint processing method 300 proceeds to block 306 where feature classification and groupings can be performed. During classification, the identity of each of the features can be determined. For example, the features can be classified as a particular finger, thumb, palm or other object. Once classified, the features can be grouped. The manner in which the groups are formed can widely vary. In most cases, the features can be grouped based on some criteria (e.g., they carry a similar attribute). For example, the two features shown in FIG. 4a and FIG. 4b can be grouped together because each of these features is located in proximity to each other or because they are from the same hand. The grouping can include some level of filtering to filter out features that are not part of the touch event. In filtering, one or more features can be rejected because they either meet some predefined criteria or because they do not meet some predefined criteria. By way of example, one of the features can be classified as a thumb located at the edge of a tablet PC. Because the thumb is being used to hold the device rather than being used to perform a task, the feature generated therefrom can be rejected, i.e., is not considered part of the touch event being processed.

Figure 5:
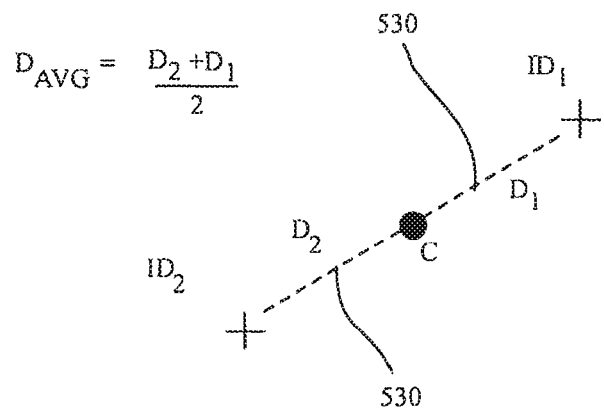
FIG. 5 illustrates an exemplary group of features according to one embodiment of this invention.

Following block 306, multipoint processing method 300 proceeds to block 308 where key parameters for the feature groups can be calculated. The key parameters can include distance between features, X/Y centroid of all features, feature rotation, total pressure of the group (e.g., pressure at centroid), and the like. As shown in FIG. 5, the calculation can include finding the centroid C, drawing a virtual line 530 to each feature from the centroid C, defining the distance D for each virtual line ($D_1$ and $D_2$), and then averaging the distances $D_1$ and $D_2$. Once the parameters are calculated, the parameter values can be reported. The parameter values can be typically reported with a group identifier (GID) and number of features within each group (in this case three). In most cases, both initial and current parameter values can be reported. The initial parameter values can be based on set down, i.e., when the user sets their fingers on the touch screen, and the current values can be based on any point within a stroke occurring after set down.

Referring again to FIG. 3, blocks 302-308 can be repetitively performed during a user stroke thereby generating a plurality of sequentially configured signals. The initial and current parameters can be compared in later steps to perform actions in the system.

Following block 308, the process flow proceeds to block 310 where the group can be associated with a user interface (UI) element. UI elements can be buttons boxes, lists, sliders, wheels, knobs, etc. Each UI element can represent a component or control of the user interface. The application behind the UI element(s) can have access to the parameter data calculated in block 308. In one implementation, the application can rank the relevance of the touch data to the UI element corresponding there to. The ranking can be based on some predetermined criteria. The ranking can include producing a figure of merit and, whichever UI element has the highest figure of merit, giving it sole access to the group. There can even be some degree of hysteresis as well (e.g., once one of the UI elements claims control of that group, the group sticks with the UI element until another UI element has a much higher ranking). By way of example, the ranking can include determining proximity of the centroid (or features) to the image object associated with the UI element.

Following block 310, multipoint processing method 300 proceeds to blocks 312 and 314. Blocks 312 and 314 can be performed approximately at the same time. From the user perspective, in one embodiment, blocks 312 and 314 appear to be performed concurrently. In block 312, one or more actions can be performed based on differences between initial and current parameter values, and can also be based to a UI element to which they are associated, if any. In block 314, user feedback pertaining to the one ore more action being performed can be provided. By way of example, user feedback can include display, audio, tactile feedback and/or the like.

Figure 6:
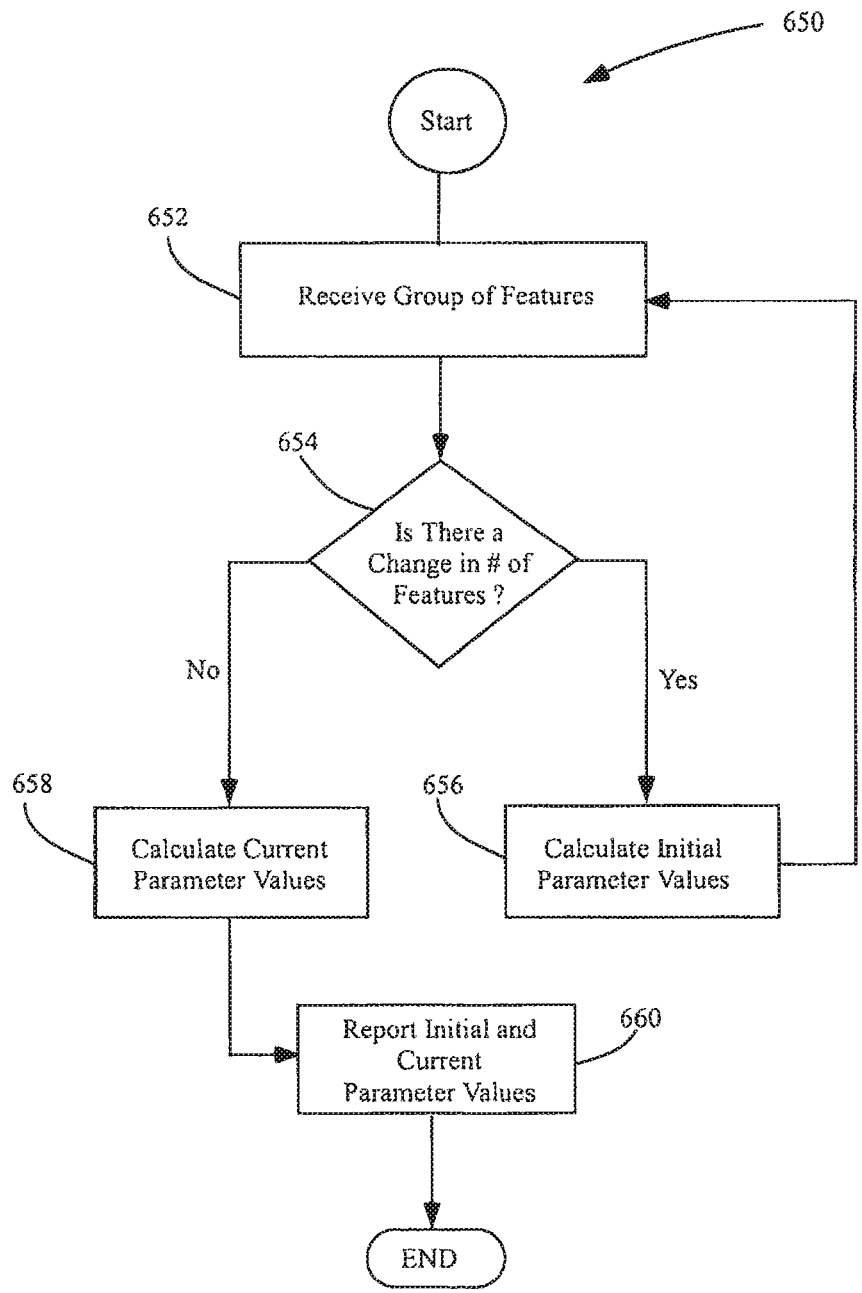
FIG. 6 illustrates an exemplary parameter calculation method according to one embodiment of this invention.

FIG. 6 illustrates a parameter calculation method 650 in accordance with embodiments of the invention. Parameter calculation method 650 can, for example, correspond to block 308 shown in FIG. 3. The parameter calculation method 650 generally begins at block 652 where a group of features can be received. Following block 652, the parameter calculation method 650 proceeds to block 654 where a determination can be made as to whether or not the number of features in the group of features has changed. For example, the number of features can have changed due to the user picking up or placing an additional finger. Different fingers can be needed to perform different controls (e.g., tracking, gesturing). If the number of features has changed, the parameter calculation method 650 proceeds to block 656 where the initial parameter values can be calculated. If the number stays the same, the parameter calculation method 650 proceeds to block 658 where the current parameter values can be calculated. Thereafter, the parameter calculation method 650 proceeds to block 660 where the initial and current parameter values can be reported. By way of example, the initial parameter values can contain the average initial distance between points (or Distance (AVG) initial) and the current parameter values can contain the average current distance between points (or Distance (AVG) current). These can be compared in subsequent steps in order to control various aspects of a computer system.

The above methods and techniques can be used to implement any number of GUI interface objects and actions. The detection and implementation of such gestures can be performed by a processor executing firmware or software. For example, a substantially simultaneous placement of two or more fingers upon a sensor panel, or the placement of two or more fingers upon the sensor panel in relatively close proximity to each other, can invoke a position control function. Changes to the fingers can then invoke a motion continuation mode.

Figure 7:
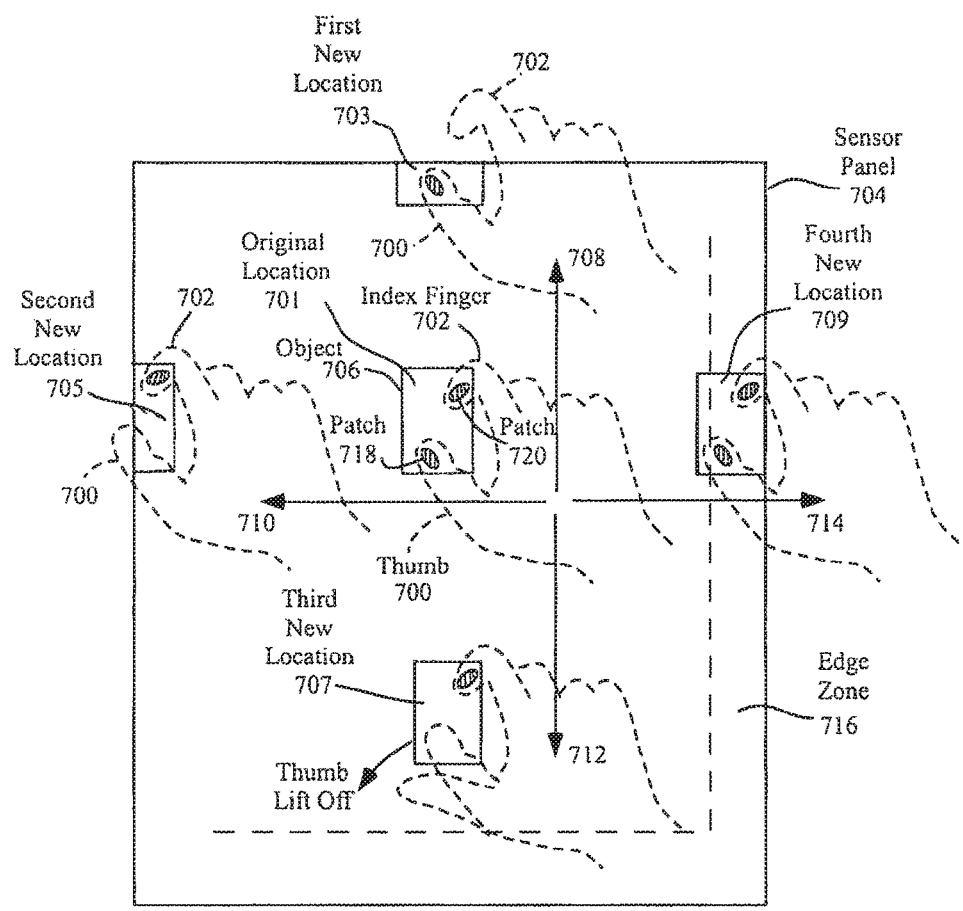
FIG. 7 illustrates several exemplary conversions from a position control mode to a motion continuation mode according to embodiments of this invention.

FIG. 7 illustrates several exemplary conversions from a position control mode to motion continuation mode according to embodiments of the invention. In the example of FIG. 7, a position control mode can be invoked when the user places two or more fingers upon sensor panel 704 at original location 701. In alternative embodiments, the placement of the two fingers onto the sensor panel can be performed substantially simultaneously and/or can be within a certain distance of each other to invoke the position control mode. Although two fingers (thumb 700 and index finger 702) are shown in FIG. 7, any two or more fingers can be used. In some embodiments, fingers 700 and 702 can be placed down near or over a cursor, icon, etc. (collectively referred to as an object) 706 to perform position control (movement) of the cursor or object. In other embodiments, fingers 700 and 702 can be placed down anywhere, and an object to be moved can appear near or under the fingers. As long as the two or more fingers remain touching the sensor panel, the fingers can be moved around to effect position control on the object. It should be understood that although FIG. 7 illustrates a touchscreen embodiment with object 706 appearing near or under the user's fingers, in tablet or other non-touchscreen embodiments, images such as object 706 along with any other images can appear on a separate display device.

In embodiments of the invention illustrated in FIG. 7, a motion continuation mode, which can include scrolling or dragging, can be invoked when one or more fingers are lifted off, but at least one finger remains in contact with the sensor panel, while the two or more fingers are being moved along the sensor panel. This liftoff of fingers can be performed anywhere on the sensor panel, or can be limited to the edge of the sensor panel (where one or more fingers can be expected to move off the sensor panel to effectively create a liftoff condition). The latter can be detected in part by recognizing edge zones. In still another embodiment, if two or more fingers are detected in an edge zone, the cursor motion continuation mode can be invoked even though no fingers are lifted.

FIG. 7 illustrates a first exemplary situation where the user has maintained two fingers on the surface of the sensor panel (see patches or images of touch 718 and 720), but has moved the hand upward (see directional arrow 708) to first new location 703 until index finger 702 has moved off the sensor panel, leaving only thumb 700 touching the sensor panel. Note that position control has been in operation to this point, with object 706 moving along with the fingers. The movement of index finger 702 off the sensor panel can be interpreted as a finger liftoff, at which time a motion continuation mode (to be discussed in greater detail hereinafter) can be invoked.

FIG. 7 also illustrates a second exemplary situation where the user has maintained two fingers on the surface of the sensor panel, but has moved the hand to the left (see directional arrow 710) to second new location 705 until thumb 700 has moved off the sensor panel, leaving only index finger 702 touching the sensor panel. Note that position control has been in operation to this point, with object 706 moving along with the fingers. The movement of thumb 700 off the sensor panel can be interpreted as a finger liftoff, at which time the motion continuation mode can be invoked.

FIG. 7 also illustrates a third exemplary situation where the user maintains two fingers on the surface of the sensor panel while moving the hand downward (see directional arrow 712) to third new location 707 until a point in time at which thumb 700 lifts off the sensor panel, leaving only index finger 702 touching the sensor panel. Note that position control has been in operation to this point, with object 706 moving along with the fingers. Note also that in this example, neither finger was near the edge of the sensor panel. The liftoff of thumb 700 can invoke the motion continuation mode.

FIG. 7 also illustrates a fourth exemplary situation where the user maintains two fingers on the surface of the sensor panel while moving the hand to the right (see directional arrow 714) to fourth new location 709 until a point in time at which both thumb 700 and index finger 702 are touching edge zone 716 on the sensor panel. Note that position control has been in operation to this point, with object 706 moving along with the fingers. The detection of thumb 700 and index finger 702 in edge zone 716 can invoke the motion continuation mode, even though neither finger has lifted off the sensor panel.

Figure 8:
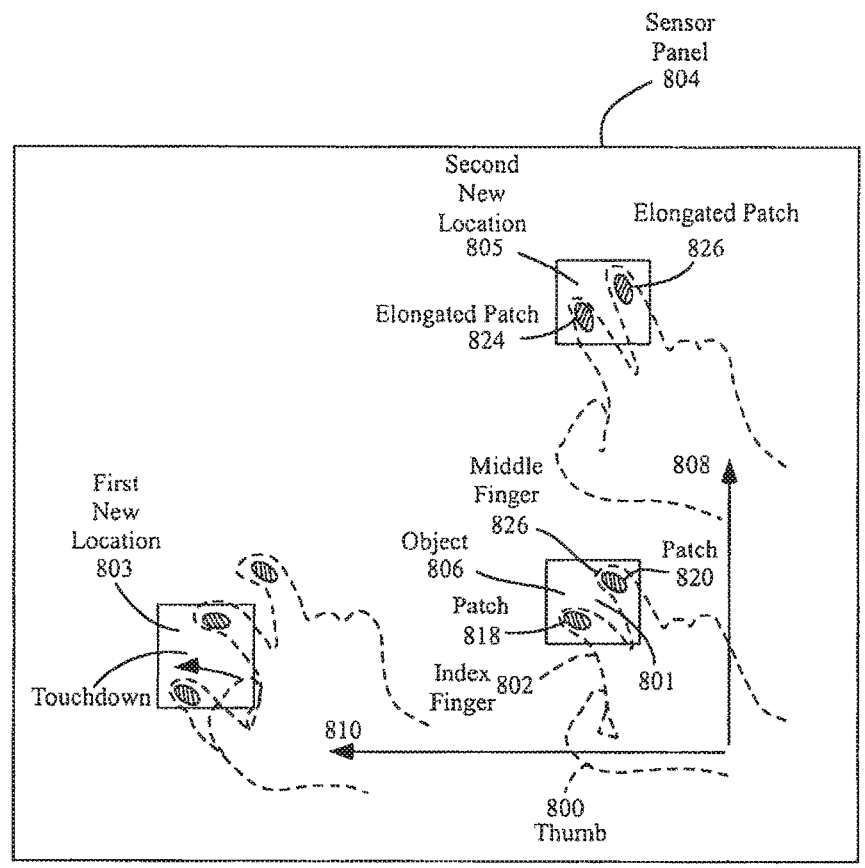
FIG. 8 illustrates several other exemplary conversions from a position control mode to a motion continuation mode according to embodiments of the invention.

FIG. 8 illustrates several other exemplary conversions from a position control mode to a motion continuation mode according to embodiments of the invention. In the example of FIG. 8, a position control mode can be invoked when the user places two or more fingers upon sensor panel 804 at original location 801. In alternative embodiments, the placement of the two fingers onto the sensor panel can be performed substantially simultaneously and/or can be within a certain distance of each other to invoke the position control mode. Although two fingers (index finger 802 and middle finger 822) are shown in FIG. 8, any two or more fingers can be used. In some embodiments, fingers 802 and 822 can be placed down near or over object 806 to perform position control (movement) of the cursor or object. In other embodiments, fingers 802 and 822 can be placed down anywhere on the sensor panel, and an object to be moved can appear near or under the fingers. As long as the two or more fingers remain touching the sensor panel, the fingers can be moved around to effect position control on the object. It should be understood that although FIG. 8 illustrates a touchscreen embodiment with object 806 appearing near or under the user's fingers, in tablet or other non-touchscreen embodiments, images such as object 806 along with any other images can appear on a separate display device. In other embodiments not shown in FIG. 8, only one finger can be touched down to invoke the position control mode.

In embodiments of the invention illustrated in FIG. 8, a motion continuation mode, which can include scrolling or dragging, can be invoked when one or more additional fingers are touched down on the sensor panel while the one or more already-touching fingers remain in contact with the sensor panel, or the one or more already-touching fingers are pushed down with more force or otherwise flattened against the sensor panel, while the one or more already-touching fingers are being moved along the sensor panel. This touchdown or flattening of fingers can be performed anywhere on the sensor panel. In alternative embodiments, the placement of the one or more additional fingers onto the sensor panel can be performed within a certain distance of each other to invoke the motion continuation mode.

FIG. 8 also illustrates a second exemplary situation where the user has maintained two fingers on the surface of the sensor panel (see patches or images of touch 818 and 820), but has moved the hand upwards (see directional arrow 808) to second new location 805 until a point in time at which fingers 802 and 822 are pushed down harder or otherwise flattened against the sensor panel (see the resulting larger patches 824 and 826). Note that position control has been in operation to this point, with object 806 moving along with the fingers. The sensing of additional force upon the sensor panel or the detection of larger patches can invoke the motion continuation mode. Force-sensing touch sensor panels are described in U.S. application Ser. No. 11/818,335 entitled "Touch Screen Stack-Up Processing," filed on Jan. 5, 2007 and published as U.S. Patent Application Publication No. 2008/0165139, the contents of which are incorporated by reference herein.

If the motion continuation mode is invoked as described above, scrolling of the viewable area or dragging of a cursor or object can continue in a particular direction. The remaining touching fingers do not have to continue moving. For example, if the motion continuation mode is invoked after an upward motion of the touching-fingers, upward scrolling of text, images and the like can occur even if the remaining touching fingers stop moving (which can occur at an edge of the sensor panel). The object can remain substantially stationary at the approximate location of the touching fingers while scrolling or dragging of the object can continue. In the present example of upward movement, the scrolling or dragging can be performed in an upward direction at a fixed speed, or the speed and direction can be substantially similar to the speed and direction of the touching fingers at the time the motion continuation mode was invoked. The latter can require memory to auto-regressively store finger velocity and direction so that when the motion continuation mode is invoked, the last stored velocity and direction can be retrieved, and the object can continue to move with the stored velocity in the stored direction.

If, during the motion continuation mode, one or more additional fingers are lifted off the sensor panel, scrolling or dragging can cease. If one or more fingers are put back down, normal object position control (dragging) can once again be invoked. Thus, the user can easily choose between position control for fine positioning within the viewable area and motion continuation of an object for navigation over large distances.

FIGS. 9*a*-9*h* illustrate the operation of an exemplary virtual control ring that can be generated during the motion continuation mode according to embodiments of the invention. When the motion continuation mode is invoked, a virtual control ring or joystick can be generated to provide enhanced motion control capabilities. Note that the virtual control ring can either be displayed to the user or kept invisible. The virtual control ring can be used as a joystick to navigate within a document, photo, web page, e-mail list, address book, calendar, game, and the like, especially on small sensor panels.

Figures 9A, 9B, 9C:
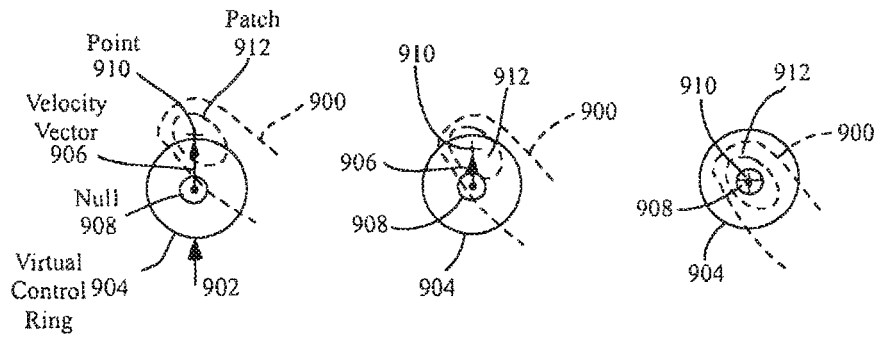
FIGS. 9*a*-9*h* illustrate the operation of an exemplary virtual control ring that can be generated during the motion continuation mode according to one embodiment of this invention.

In the example of FIG. 9*a*, if finger 900 is being moved in forward direction 902 at the time the motion continuation mode is invoked, virtual control ring 904 can be formed with velocity vector 906 pointed in the forward direction and a magnitude proportional to the velocity of finger 900 at the time motion continuation was invoked. Velocity vector 906 can represent the velocity of motion continuation, and can originate from null 908 in virtual control ring 904.

Back calculations based on the velocity of finger 900 at the time motion continuation was invoked can be performed to determine the zero velocity "null" 908 or center position of virtual control ring 904. In general, the farther a centroid of touch generated by the touching finger is located from the null, the greater the velocity (up to some maximum velocity), and the closer to the null, the slower the velocity. In keyboard embodiments without a touch screen, because null 908 can get harder to re-locate the further finger 900 is away from the null, the null can be made wider (a null circle) instead of just a point. This can make it easier to move finger 900 (as defined by the centroid of the patch) into the null to stop motion.

Note that point 910 of velocity vector 906 can be coincident with the calculated centroid of patch 912 generated by finger 900. Virtual control ring 904 can follow finger 900 whether it becomes stationary after the motion continuation mode is invoked or continues to move in direction 902, or in other embodiments can remain stationary whether finger 900 continues to move or remains stationary.

If finger 900 moves backward from the position shown in FIG. 9a to a position shown in FIG. 9b (i.e. backward with respect to null 908), velocity vector 906 can shrink, indicating a smaller forward velocity. As long as the finger centroid remains forward of the null and the vector points forward, forward motion continues. If finger 900 continues to move backward to a position shown in FIG. 9c (i.e. directly over null 908), velocity vector 906 can disappear, indicating no forward velocity. In other words, if the finger centroid is pulled back to the null, the vector can shrink down to zero, and motion can stop. If finger 900 continues to move backward to a position shown in FIG. 9d, velocity vector 906 can point backward, indicating a backward velocity (i.e. motion continuation in the opposite direction).

Figures 9D, 9E, 9F:
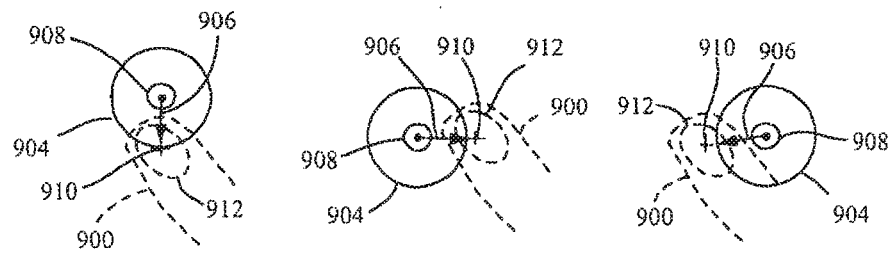
Figure 9G:
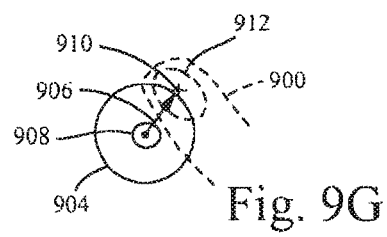

It should be noted that finger 900 can move in other directions, such as right, left, and at an angle, velocity vectors can be formed in those directions, the virtual control rings FIG. 9e, FIG. 9f, and FIG. 9g can be generated, and motion can continue in those directions. In other words, the velocity vector within the virtual control ring can act as a joystick, with the velocity and direction of the motion continuation being controllable by a finger as it moves within the control ring.

However, the finger can, on occasion, move beyond the virtual control ring. As mentioned above, the farther the finger is moved from the null, the greater the velocity, up to a maximum limit that still allows reasonable controllability. Because movements far from the null will not increase the velocity beyond this maximum limit, yet such large movements make it harder to re-locate the null (in tablet or keyboard embodiments where the virtual control ring is not visible), the entire virtual control ring and null can move along with the finger so that the finger is always at or within the boundaries of the virtual control ring and close to the null.

It should also be noted that the virtual control ring need not be perfectly circular. It can be oblong or ellipsoid to provide more or less-sensitive velocity control along a preferred axis, such as the axis of finger motion prior to entering motion continuation mode.

Figure 9H:
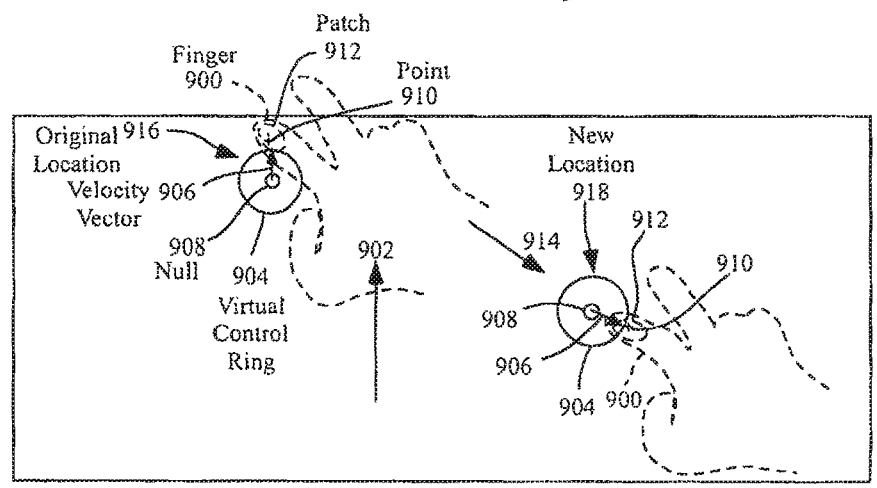

FIG. 9h shows virtual control ring 904 with forward velocity vector 906 originally generated at location 916 due to hand 914 moving upward in direction 902 at the time the motion continuation mode was invoked. If, during the motion continuation mode, finger 900 is dragged far from null 908 in direction 914 to new location 918, velocity vector 906 can now be pointed in the same direction as 914. However, the magnitude of velocity vector 906 will not be based on a linear interpolation outward from null 908 in virtual control ring 904 at original location 916, but rather the velocity can be clipped at the maximum limit and velocity vector 906 will never extend beyond the limits imposed by the virtual control ring. Because of this velocity limitation, as shown in FIG. 9h, virtual control ring 904 and null 908 can be pulled along with finger 900 as it moves to new location 918. Thus, the location of virtual control ring 904 and null 908 can become relative to finger 900, so that the finger can effect speed and directional control with very little movement of the finger.

The virtual control ring can be used as a joystick to move around in a document, web page, lists, games, especially on small sensor panels and touchscreens. the position control mode can be used for moving around to an exact position within a visible area of the screen, while the motion continuation mode, because it has variable velocity and direction, can be better for changing the visible area of the screen to a portion far away that is not currently visible (in which case highest velocity can be used), or to a portion nearby (in which case low velocity can be used).

Figure 10A:
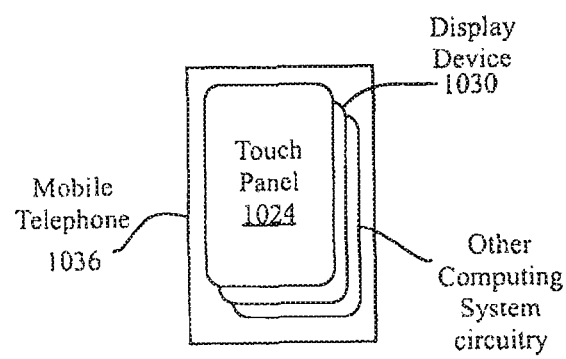
FIG. 10*a* illustrates an exemplary mobile telephone that can include a touch sensor panel, display device, and other computing system blocks in the computing system of FIG. 1 that can detect finger and hand motions and switch between position control and motion continuation modes according to one embodiment of this invention.

FIG. 10a illustrates an exemplary mobile telephone 1036 that can include touch sensor panel 1024, display device 1030, and other computing system blocks in computing system 100 of FIG. 1 that can detect finger and hand motions and switch between position control and motion continuation modes according to embodiments of the invention.

Figure 10B:
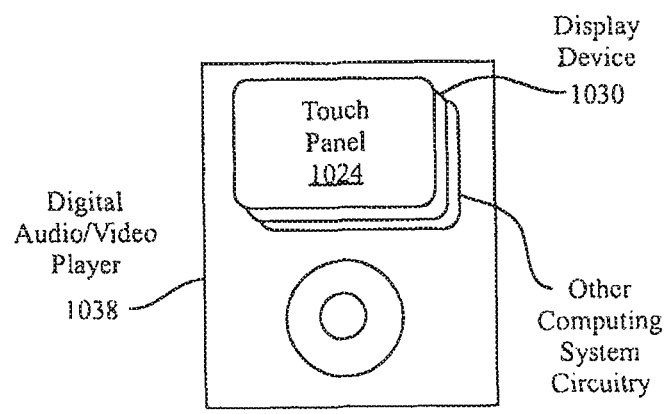
FIG. 10*b* illustrates an exemplary digital audio/video player that can include a touch sensor panel, display device, and other computing system blocks in the computing system of FIG. 1 that can detect finger and hand motions and switch between position control and motion continuation modes according to one embodiment of this invention.

FIG. 10b illustrates an exemplary digital audio/video player 1038 that can include touch sensor panel 1024, display device 1030, and other computing system blocks in computing system 100 of FIG. 1 that can detect finger and hand motions and switch between position control and motion continuation modes according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for converting from a position control mode to a motion continuation mode on a sensor panel, comprising:
   entering the position control mode upon detecting a touchdown of one or more initial fingers on the sensor panel, wherein during the position control mode, motion of an operation is presented by a display;
   detecting a touchdown of one or more additional fingers onto the sensor panel while the one or more initial fingers are being moved along the sensor panel;
   entering the motion continuation mode upon the detection of the touchdown of the one or more additional fingers; and
   continuing the motion of the operation being presented by the display during the position control mode in a direction of movement of the one or more initial fingers detected during the touchdown of the one or more additional fingers when the motion continuation mode is entered;
   wherein once the motion continuation mode is entered, the motion of the operation being presented by the display during the position control mode is continued regardless of a position of the at least one finger remaining in contact with the sensor panel.

2. The method of claim 1, the detected movement of the one or more initial fingers including a velocity of the movement detected during the touchdown, the method further comprising generating a virtual control ring upon entering the motion continuation mode, the virtual control ring for controlling the velocity and direction of the motion being presented by the display and continued during the motion continuation mode.

3. The method of claim 2, the motion of the operation being presented by the display and continued including scrolling of a viewable area or dragging an object in a direction and at a velocity substantially similar to the direction and velocity of the one or more initial fingers being moved along the sensor panel when the motion continuation mode was entered.

4. The method of claim 3, further comprising generating a velocity vector within the virtual control ring whose magnitude and direction is proportional to the velocity and direction of the motion being presented by the display and continued.

5. The method of claim 4, further comprising generating a null within the virtual control ring for stopping the motion being presented by the display and continued.

6. The method of claim 4, further comprising moving one of the fingers in contact with the sensor panel within the virtual control ring to adjust the magnitude and direction of the velocity vector and control the velocity and direction of the motion being presented by the display and continued.

7. The method of claim 1, further comprising pulling the virtual control ring along with one of the fingers in contact with the sensor panel if the finger moves beyond an original location of the virtual control ring established when the motion continuation mode was invoked.

8. The method of claim 1, further comprising continuing to scroll a viewable area or continuing to drag an object being presented by the display after entering the motion continuation mode and detecting that all fingers remaining in contact with the sensor panel have substantially ceased further movement.

9. The method of claim 8, further comprising continuing to scroll the viewable area or continuing to drag the object being presented at the display in a direction and at a velocity substantially similar to the direction and velocity of the one or more fingers being moved along the sensor panel when the motion continuation mode was entered.

10. The method of claim 1, further comprising entering the motion continuation mode upon detecting the touchdown of the one or more additional fingers on the sensor panel within a predetermined distance from at least one initial finger already touching the sensor panel.

11. The method of claim 1, further comprising entering the motion continuation mode upon detecting the touchdown of the one or more additional fingers on the sensor panel near or over an object.

12. The method of claim 1, further comprising generating an object to be moved upon detecting the touchdown of the one or more fingers on the sensor panel.

13. A method for converting from a position control mode to a motion continuation mode on a sensor panel, comprising:
   entering the position control mode upon detecting a touchdown of one or more fingers on the sensor panel, wherein during the position control mode, motion of an operation is presented by a display;
   detecting an application of increased force from at least one of the one or more fingers upon the sensor panel while the one or more fingers are being moved along the sensor panel;
   entering the motion continuation mode upon the detection of the application of increased force; and
   continuing the motion of the operation being presented by the display during the position control mode in a direction of movement of the one or more fingers detected during the application of increased force when the motion continuation mode is entered;
   wherein once the motion continuation mode is entered, the motion of the operation being presented by the display during the position control mode is continued regardless of a position of the at least one finger remaining in contact with the sensor panel.

14. A method for converting from a position control mode to a motion continuation mode on a sensor panel, comprising:
   entering the position control mode upon detecting a touchdown of one or more fingers on the sensor panel, wherein during the position control mode, motion of an operation is presented by a display;
   detecting a flattening of at least one of the one or more fingers on the sensor panel while the one or more fingers are being moved along the sensor panel;
   entering the motion continuation mode upon the detection of the flattening finger; and
   continuing the motion of the operation being presented by the display during the position control mode in a direction of movement of the one or more fingers detected during the flattening of at least one of the one or more fingers when the motion continuation mode is entered;
   wherein once the motion continuation mode is entered, the motion of the operation being presented by the display during the position control mode is continued regardless of a position of the at least one finger remaining in contact with the sensor panel.

15. A non-transitory computer-readable storage medium comprising program code for converting from a position control mode to a motion continuation mode on a sensor panel, the program code for causing performance of a method comprising:
   entering the position control mode upon detecting a touchdown of one or more initial fingers on the sensor panel, wherein during the position control mode, motion of an operation is presented by a display;
   detecting a touchdown of one or more additional fingers onto the sensor panel while the one or more initial fingers are being moved along the sensor panel;
   entering the motion continuation mode upon the detection of the touchdown of the one or more additional fingers; and
   continuing the motion of the operation being presented by the display during the position control mode in a direction of movement of the one or more initial fingers detected during the touchdown of the one or more additional fingers when the motion continuation mode is entered;
   wherein once the motion continuation mode is entered, the motion of the operation being presented by the display during the position control mode is continued regardless of a position of the at least one finger remaining in contact with the sensor panel.

16. The non-transitory computer-readable storage medium of claim 15, the detected movement of the two or more fingers including a velocity of the movement detected during the liftoff, the program code further for causing performance of a method comprising generating a virtual control ring upon entering the motion continuation mode, the virtual control ring for controlling the velocity and direction of the motion being presented by the display and continued during the motion continuation mode.

17. The non-transitory computer-readable storage medium of claim 16, the motion of the operation being presented by the display and continued including scrolling of a viewable area or dragging an object in a direction and at a velocity substantially similar to the direction and velocity of the one or more initial fingers being moved along the sensor panel when the motion continuation mode was entered.

18. The non-transitory computer-readable storage medium of claim 17, the program code further for causing performance of a method comprising generating a velocity vector within the virtual control ring whose magnitude and direction is proportional to the velocity and direction of the motion being presented by the display and continued.

19. The non-transitory computer-readable storage medium of claim 18, the program code further for causing performance of a method comprising generating a null within the virtual control ring for stopping the motion being presented by the display and continued.

20. The non-transitory computer-readable storage medium of claim 18, the program code further for causing performance of a method comprising moving one of the fingers in contact with the sensor panel within the virtual control ring to adjust the magnitude and direction of the velocity vector and control the velocity and direction of the motion being presented by the display and continued.

21. The non-transitory computer-readable storage medium of claim 15, the program code further for causing performance of a method comprising pulling the virtual control ring along with one of the fingers in contact with the sensor panel if the finger moves beyond an original location of the virtual control ring established when the motion continuation mode was invoked.

22. The non-transitory computer-readable storage medium of claim 15, the program code further for causing performance of a method comprising continuing to scroll a viewable area or continuing to drag an object being presented by the display after entering the motion continuation mode and detecting that all fingers remaining in contact with the sensor panel have substantially ceased further movement.

23. The non-transitory computer-readable storage medium of claim 22, the program code further for causing performance of a method comprising continuing to scroll the viewable area or continuing to drag the object being presented at the display in a direction and at a velocity substantially similar to the direction and velocity of the one or more fingers being moved along the sensor panel when the motion continuation mode was entered.

24. The non-transitory computer-readable storage medium of claim 15, the program code further for causing performance of a method comprising entering the motion continuation mode upon detecting the touchdown of the one or more additional fingers on the sensor panel within a predetermined distance from at least one initial finger already touching the sensor panel.

25. The non-transitory computer-readable storage medium of claim 15, the program code further for causing performance of a method comprising entering the position control mode upon detecting the touchdown of the one or more fingers on the sensor panel near or over an object.

* * * * *